United States Patent Office 3,655,776
Patented Apr. 11, 1972

3,655,776
PHLOROGLUCINOL DERIVATIVES
Victor Lafon, Paris, France, assignor to Societe
Anonyme dite: Orsymonde, Paris, France
No Drawing. Filed Sept. 4, 1969, Ser. No. 855,371
Claims priority, application Great Britain, Sept. 9, 1968,
42,870/68
Int. Cl. C07c 43/22
U.S. Cl. 260—613 D
3 Claims

ABSTRACT OF THE DISCLOSURE

This invention is concerned with new phloroglucinol derivatives obtained by condensing a molecule of 1,3,5-trihydroxy-benzene with one or two molecules of glycol chlorhydrin.

(2-chloroethoxy) - 3,5 - dihydroxy-benzene has antispasmodic properties and 3,5-di(2-chloroethoxy)-phenol shows tranquilising activities.

---

The present invention concerns new derivatives of phloroglucinol obtained by condensing a molecule of phloroglucinol with one or two molecules of glycol chlorhydrin.

More particularly the invention concerns compounds of the formula:

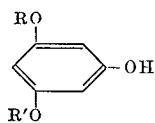

in which R represents a chloroethyl group and R' represents a hydrogen atom or a chloroethyl group.

The two compounds according to the invention, that is to say the 1 - (2-chloroethoxy)-3,5-dihydroxy-benzene and the 3,5-di(2-chloroethoxy)-phenol, have interesting therapeutic properties. The first is endowed with a very distinct antispasmodic activity and the second with a tranquilising activity.

PROCESS OF PREPARATION

When phloroglucinol is treated with glycol chlorhydrin in an ice bath and in a current of gaseous hydrochloric acid, 1-(2-chloroethoxy)-3,5-dihydroxy-benzene and 3,5-di(2-chloroethoxy)-phenol are formed at the same time:

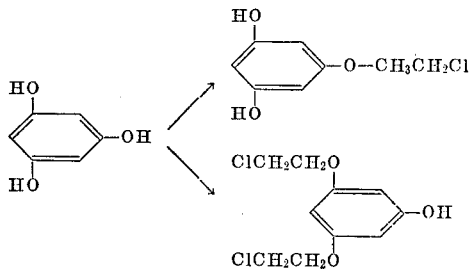

If, after removing the chlorhydrin by distillation under reduced pressure, the product of the reaction is taken up in benzene, and the benzene solution is extracted with water, the 1-(2-chloroethoxy) - 3,5 - dihydroxy-benzene passes into aqueous solution, whilst the 3,5-di(2-chloroethoxy)-phenol stays in benzene solution.

The two compounds formed are thus separated from the aqueous solution and from the benzene solution respectively.

The following examples illustrate the preparation of the compounds according to the invention:

EXAMPLE 1

1-(2-chloroethoxy)-3,5-dihydroxy-benzene

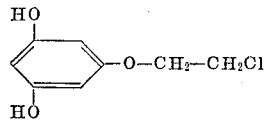

63 g. of anhydrous phloroglucinol and then 500 cc. of glycol chlorhydrin were added to a 1-litre round-bottom flask equipped with stirring, mixing and cooling devices as well as with a bubble-counter outlet and then stirred, in order to dissolve the triol. The flask was immersed in a bath of ice.

A rapid current of HCl was passed through for 2 hours and the agitation was then stopped. The flask was stoppered and kept for a week in darkness at ambient temperature and the yellow deposit was then filtered off. The liquid was distilled under reduced pressure until no more chlorhydrin remained.

It was taken up in 500 cc. of benzene whilst stirring and under reflux. It was left to settle for a night. The insoluble matter was filtered off and washed with a little benzene.

The benzene filtrate was extracted with 3 × 200 cc. of water.

The 1-(2-chloroethoxy)-3,5-dihydroxy-benzene passed into aqueous solution.

The di-3,5-(2-chloroethoxy)-phenol remained in the benzene. It was treated later by another method.

The aqueous solution was concentrated and dried under vacuum.

It was taken up again in methyl chloride and the solution was filtered and evaporated. The resulting product was recrystallised from 150 cc. of benzene.

The 1-(2-chloroethoxy)-3,5-dihydroxy-benzene slowly crystallised.

It was filtered off and washed with a very little iced benzene. It was dried under vacuum over $P_2O_5$. 4.2 g. of slightly pink crystals were obtained. Yield: 4.45%. M.P.: 103° C.

*Analysis* (percent): OH, 17.5 (in theory 18.5); Cl, 19.05 (in theory 18.85).

Solubilities: the product was soluble in water, benzene, methyl chloride, alcohol, and acetone.

EXAMPLE 2

3,5-di(2-chloroethoxy)-phenol

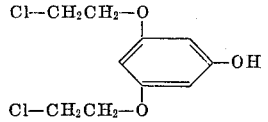

63 g. of anhydrous phloroglucinol (0.5 mole) were added to a 1 litre round-bottom flask provided with stirring, mixing and cooling devices as well as with a bubble-counter outlet.

500 cc. of glycol chlorhydrin were added and stirred until dissolved. The flask was then immersed in an ice bath.

A rapid current of HCl was passed through for 2 hours an agitation was then stopped. The flask was then stoppered and kept for a week in darkness at ambient temperature and the yellow deposit was then filtered off. The liquid was distilled under reduced pressure until no more chlorhydrin passed over. It was taken up by 500 cc. of benzene whilst stirring and left to settle for one night.

The insoluble matter was filtered off and washed with a little benzene.

The benzene filtrate was washed with 3× 200 cc. of water.

The 3,5-di-(2-chloroethoxy)-phenol remained in benzene solution.

The 1-(2-chloroethoxy)-3,5-dihydroxy-benzene remained in aqueous solution, which was treated by other means. The benzene was dried over sodium sulphate and distilled. It was then taken up in boiling water and recrystallised. For this process, the distillation residue was taken up in 100 cc. of boiling water and filtered at boiling point while preventing the insoluble oil from passing over. It was then left to crystallise in the refrigerator.

The crystals were filtered off and the filtrate was used in the second cropping which was carried out in the same way as the first. Four croppings were sufficient.

The crystals were dried in vacuum over $P_2O_5$.

4.2 g. (yield 3.0%) of crystals in the form of slightly pink, silky needles, were obtained. M.P.: 101° C.

The product was soluble in ether, benzene, $CH_2Cl_2$, alcohol and acetone. It was insoluble in water (though slightly soluble in hot water).

PHARMACOLOGICAL STUDY OF 1-(2-CHLORO-ETHOXY)-3,5-DIHYDROXY-BENZENE

In order to study the pharmacological properties of this product, a solution of 3 g. per 100 in distilled water was used.

ACUTE TOXICITY IN MICE

The DL–50 was intravenously determined in mice and it was found to be 370±6 mg./kg. The symptoms observed were the following: in the first phase, exophthalmy and convulsions; in the second phase, hypotony, piloerection and ptosis. In animals having intramuscularly received 190 mg./kg., piloerection, slight hypothermy (−0.7°) and a slight tranquilising action were observed.

CARDIOVASCULAR PROPERTIES STUDIED ON THE ISOLATED HEART

The action of 1-(2-chloroethoxy)-3,5-dihydroxybenzene on three hearts perfused by Van Dyke Hastings liquid containing barium chloride was studied:

In a dose of 50 mcg./ml., the product did not exert any effect.

In a dose of 100 mcg./ml., it increased the coronary output, but did not alter the cardiac rhythm.

ANTISPASMODIC ACTION (1) In vitro.—(a) Isolated rat duodenum

*Organ in the relaxed state.*—In a dose of 370 mcg./ml., the 1-(2-chloroethoxy)-3,5-dihydroxy-benzene lowered the tone of the organs by 45 to 50 mm. (the maximum contraction of these organs under the influence of acetylcholine was 50 mm.).

*Organ contracted by barium chloride.*—The product in a dose of 370 mcg./ml. decontracted by 100% the organs subjected to the action of barium (3 experiments). The DL–50 was about 70 mcg./ml. A slightly stronger action (60% of decontraction) had been obtained with 2 mcg./ml. of papaverine. The product was about 35 times less active than papaverine.

*Organ contracted by acetylcholine.*—The product exerted an effect antagonistic to acetylcholine. The DE–50 was about 160 mcg./ml. (4 experiments). In these experiments atropine in the dose of 0.02 mcg./ml. decontracted the organs by 100%.

In a dose of 37 mg./kg. I.V. (1/10 of the DL–50 I.V.), the product causes 60% reduction for 5 mins., in one test out of four, in the bronchitic spasm caused by acetylcholine.

*Organ contracted by histamine.*—As regards the spasm produced by histamine, the product exerts an antagonistic effect in one test out of five. The maximum effect of 70% is produced 5 mins. after injection and is still 24% after another 90 mins.

(b) Isolated guinea-pig urether

In a dose of 100 mcg./ml. (experiment on two organs), the product did not exert any effect. Doses of 370 mcg./ml. and 500 mcg./ml. (experiment on 6 organs) reduced or stopped the action of barium.

(2) In vivo: Guinea-pig ileus

A dose of 37 mg./kg. administered intravenously (1/10 of the DL–50, administered intravenously) stopped peristalsis in two experiments out of three for 4 and 8 mins. respectively and did not exert any effect in the third case.

Action on choleresis 1-(2-chloroethoxy)-3,5-dihydroxy-benzene, in a dose of 37 mg./kg. administered intravenously (1/10 of the DL–50, administered intravenously) exerted a distinct (90%), prolonged (1 hour) hypercholeretic effect on anaesthetised rats. The results are summarized below:

| Dose of the product | Percent variation of the biliary output | | | | | |
|---|---|---|---|---|---|---|
| | 15 mn. | 30 mn. | 45 mn. | 60 mn. | 75 mn. | 90 mn. |
| 37 mg./kg. | +93 | +38 | +38 | +49 | +16 | +37 |

From the results of the pharmacological study, 1-(2-chloroethoxy)-3,5-dihydroxy-benzene exerted an antispasmodic effect in vitro on the duodenum and urether, in vivo on the ileum of the guinea-pig, in a dose equal to 1/10 of the DL–50 administered intravenously.

It increased the coronary output of isolated rabbit heart. In a dose equal to 1/10 of the DL–50, administered intravenously, it increased the biliary output of anaesthetized rats.

Clinically, the product had been tested for the treatment of patients suffering with hepatic disorders (migraine, digestive trouble, hepatic colic) and administered in the form of cachets, each containing 0.10 g. of the active product and 0.10 g. of lactose.

In a dose of 0.10 g. administered 3 to 4 times a day, the product exerted a very interesting antispasmodic action.

PHARMACOLOGICAL STUDY OF 3,5-DI(2-CHLOROETHOXY)-PHENOL 3,5-di-(2-chloroethoxy)-phenol was intraperitonelly administered to mice in the form of a suspension in gumarabic and distilled water.

The DL–50 was 1,195±72 mg./kg., (1067–1338 mg./kg.) given I.P.

In strong doses, a loss of the turning reflex was established and respiration reduced. The animal showed hypothermy. Death occurred in 18 to 48 hours.

In doses of 50 to 250 mg./kg., the reflexes of the animal were reduced. According to the turning rod and traction tests, the product showed a tranquilising action.

Observation of animals which had received doses of 250 mg./kg. I.P. showed loss of the "Pinna reflex" in 2 mice out of 12. The hypothermia is approximately −3.7° C.

ANTISPASMODIC ACTION

Guinea pig ileus in situ

The product, administered I.D. in a dose of 500 mg./kg., exerted no effect on intestinal peristalsis in 3 guinea pigs.

I claim:
1. A phloroglucinol derivative of the formula:
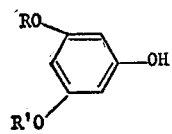
in which R is 2-chloroethyl and R' is hydrogen or 2-chloroethyl.
2. 1-(2-chloroethoxy)-3,5-dihydroxy-benzene.
3. 3,5-di-(2-chloroethoxy)-phenol.
References Cited
FOREIGN PATENTS
1,167,412   8/1958   France _____ 260—613 D
OTHER REFERENCES
Touchstone et al., Jour. Amer. Chem. Soc., vol. 78 (1956), pp. 5643–5645.
BERNARD HELFIN, Primary Examiner
U.S. Cl. X.R.
424—341